United States Patent
Nellums

[19]

[11] Patent Number: 5,957,257
[45] Date of Patent: *Sep. 28, 1999

[54] SELF-ENERGIZING SYNCHRONIZER INCLUDING FORCE LIMITING

[75] Inventor: Richard A. Nellums, Farmington Hills, Mich.

[73] Assignee: Eaton Corporation, Cleveland, Ohio

[ * ] Notice: This patent is subject to a terminal disclaimer.

[21] Appl. No.: 08/908,090

[22] Filed: Aug. 11, 1997

[51] Int. Cl.[6] .................................................. F16D 23/06
[52] U.S. Cl. .................. 192/53.31; 192/53.332; 74/339
[58] Field of Search ............... 192/53.3, 53.31, 192/53.33, 53.331, 53.332, 53.36, 53.361, 48.91; 74/339

[56] References Cited

U.S. PATENT DOCUMENTS

| | | | |
|---|---|---|---|
| 2,333,165 | 11/1943 | Fishburn | 192/53.31 |
| 2,369,843 | 2/1945 | Neracher et al. | 192/53.33 |
| 2,410,511 | 11/1946 | Letsinger et al. | 192/53.31 |
| 3,450,240 | 6/1969 | Lewis et al. | 192/53.361 |
| 4,811,825 | 3/1989 | Christian et al. | 74/339 X |
| 5,078,245 | 1/1992 | Nellums et al. | 192/53.332 |
| 5,092,439 | 3/1992 | Reynolds | 192/53.331 |
| 5,141,087 | 8/1992 | Reynolds | 192/53.331 |
| 5,558,194 | 9/1996 | Cox | 192/53.31 |

FOREIGN PATENT DOCUMENTS 1098824  2/1961  Germany .

*Primary Examiner*—Charles A. Marmor
*Assistant Examiner*—Scott Lund
*Attorney, Agent, or Firm*—Paul S. Rulon; Howard D. Gordon

[57] ABSTRACT

A pin-type, double acting synchronizer (18) with friction clutches (22,36 and 24,38), jaw clutches (26,30 and 28,31), a shift flange (32), self-energizing ramps (21a–21d) affixed to a shaft (12), and self-energizing ramps (45a–45d) affixed to a self-energizer member (34). Engagement of the ramps provides an additive axial force ($F_a$) for increasing the engagement force of the friction clutches. The member (34) is secured for sliding movement with the flange and jaw members (30,31). The member (34) is resiliently connected for rotation with the flange by force limiting detent assemblies (50) until synchronizing torque reaches a predetermined amount. When the predetermined torque is reached, the force limiting assemblies allow the flange to rotate and engage stops (32h) for directing all torque in excess of the predetermined amount to the shaft in parallel with the self-energizing ramps.

37 Claims, 3 Drawing Sheets

SELF-ENERGIZING SYNCHRONIZER INCLUDING FORCE LIMITING

CROSS-REFERENCE TO RELATED APPLICATION

This application, having attorney docket number 97-rTRN-259, relates to U. S. application Ser. Nos. 08/908,091; 08/908,087; 08/908,086; 08/908,093; 08/908,092; filled Aug. 11, 1997, and respectively having attorney docket numbers 95-rELT-217, 95-rTRN-406, 91-TRN-499, 94-rELT-154 and 94rTRN-247, and all assigned to the assignee of this application.

FIELD OF THE INVENTION

This invention relates to a synchronizer for a transmission.

BACKGROUND OF THE INVENTION

It is well known that synchronizers may be used in multiple speed ratio transmissions to assist shifting all or some of the transmission gear ratios. It is also known that the shift effort and/or time required to perform a shift may be reduced by use of synchronizers of the self-energizing or boost type. Since required operator shift effort generally increases with vehicle size, synchronizers of the self-energizing type are especially useful in transmissions for heavy duty trucks and/or in transmissions where reduced shift time and/or reduced shift effort are preferred. Prior art examples of synchronizers that may be relevant to the synchronizer herein may be seen by reference to U.S. Pat. Nos. 5,078,245; 5,092,439; and German Patent Publication 1,098,824 which are incorporated herein by reference.

SUMMARY OF THE INVENTION

An object of this invention is to provide a synchronizer with self-energizing means and improved means to limit the amount of self-energizing.

According to the invention, a synchronizer is selectively operative to frictionally synchronize and positive connect a first drive mounted for rotation about an axis of a second drive. The synchronizer includes a first jaw member affixed to the first drive and engagable with an axially movable second jaw member in response engaging movement thereof by an axial shift force ($F_o$). The second jaw member is mounted for non-rotation and for axial movement relative to the second drive. A first friction member is secured for rotation with the first drive and a second friction member is axially movable into frictional engagement with the first friction member to provide a synchronizing torque between the drives in response to the engaging movement. Blocker means are movable into engagement in response to the engaging movement of the second jaw member for preventing asynchronous engagement of the jaw members and for transmitting the shift force ($F_o$) to the engaged friction members. First self-energizing means are affixed against movement relative to the second drive. Second self-energizing means are engagable with the first self-energizing means in response to the torque transmitted thereto. The self-energizing means are operative when engaged to produce an additive force ($F_a$) in the direction of the shift force ($F_o$) for increasing the engagement force of the friction means.

The improvement comprises force limiting means for limiting the additive force ($F_a$) to a predetermined amount of the torque and including resilient means and stop means.

The resilient means flexibly transmits the torque between blocker means and the second self-energizing means. Flexing of the resilient means in response to the torque causes relative rotation between the blocker means and the second self-energizing means. The stop means are operative when engaged in response to the predetermined amount of the torque and the relative rotation to connect the blocker means to the second drive in driving parallel with the resilient means to limit the torque reacted by the self-energizing means to the predetermined amount of the torque.

BRIEF DESCRIPTION OF THE DRAWINGS

The synchronizer of the invention is shown in the accompanying drawings in which:

FIG. 6 is a graphical representation of axial forces and torques acting on a shift flange of the synchronizer.

Figure 1:
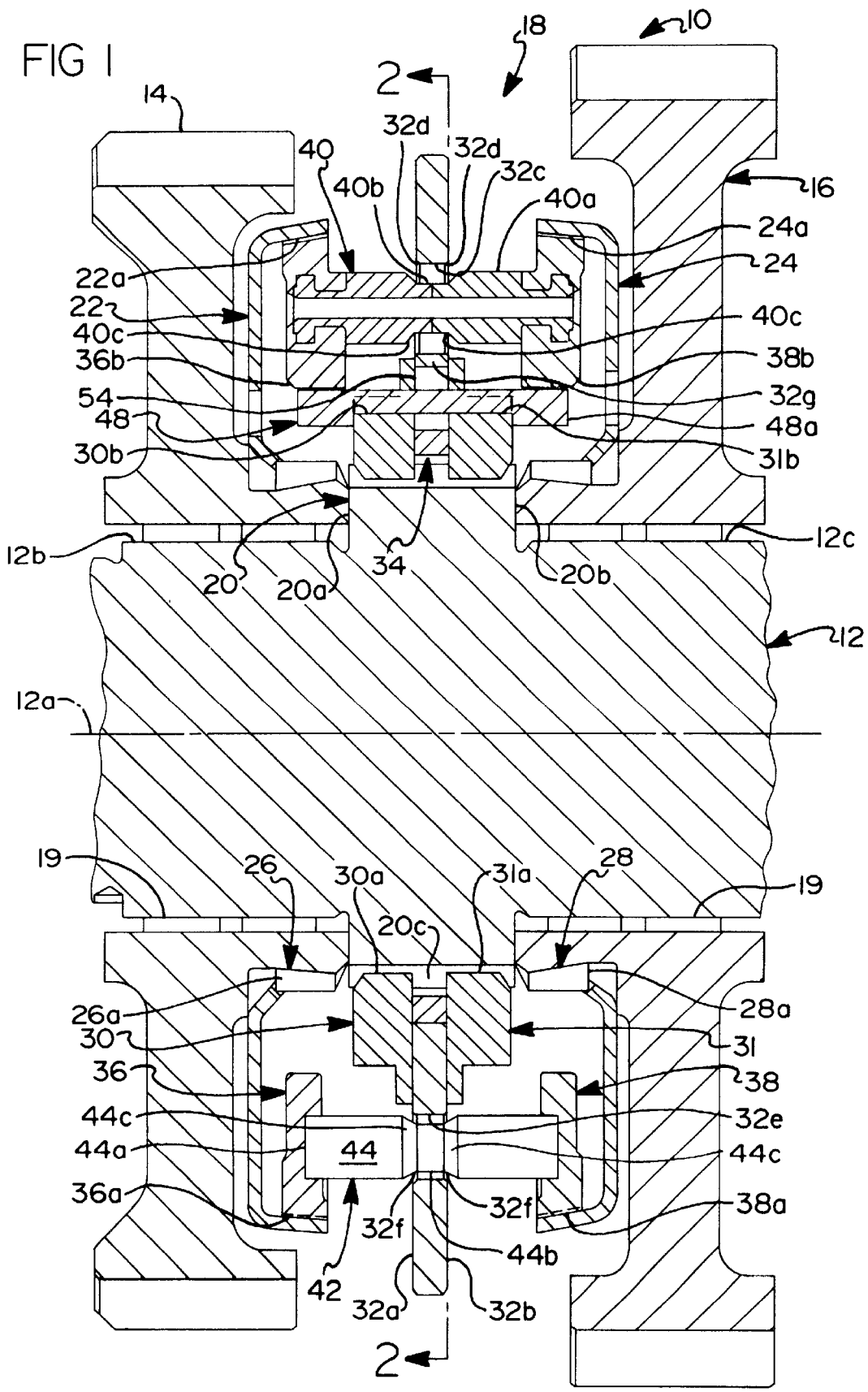
FIG. 1 illustrates a sectioned, double-acting synchronizer in a neutral position and sectioned along line 1—1 of FIG. 2.

The drawings are simplified by omitting some background lines of components therein.

DETAILED DESCRIPTION OF THE DRAWINGS

The term "synchronizer", used herein, shall designate a clutch mechanism utilized to non-rotatably couple a selected ratio gear to a shaft by means of a positive clutch in which attempted engagement of the positive clutch is prevented until members of the positive clutch are brought to substantially synchronous rotation by a synchronizing friction clutch associated with the positive clutch. The term "self-energizing" shall designate a synchronizer clutch mechanism which includes ramps or cams or the like to increase the engaging force of the synchronizing friction clutch in relation to the synchronizing torque of the friction clutch.

Looking now at the drawings, therein is shown a gear and synchronizer assembly 10 including a drive or shaft 12 to be mounted for rotation in a transmission about an axis 12a, axially spaced apart drives or gears 14, 16, and a double-acting synchronizer 18.

The shaft 12 includes cylindrical surfaces 12b, 12c rotatably supporting the gears thereon via bearings 19 and an annular member 20 having an outer circumference greater in diameter than the diameters of the cylindrical surfaces. The annular member has an axial length separating the gears via axially oppositely facing shoulders 20a, 20b which limit axial movement of the gears toward each other. Axial movement of the gears away from each other is limited in any of several known manners. The annular member may be formed of a ring affixed to the shaft or, as herein, formed integral with the shaft.

The synchronizer mechanism 18 includes friction rings 22, 24 and jaw members 26, 28 affixed to gears 14,16, axially movable jaw members 30, 31 having internal spline teeth 30a, 31a slidably mating continuously with the external spline teeth 20c formed in the outer circumference of annular member 20, a radially extending shift flange 32 having axially oppositely facing sides 32a, 32b sandwiched between axially facing sides of jaw members 30, 31, a self-energizer ring 34, axially movable annular friction rings 36, 38 rigidly secured together by three circumferentially spaced apart pins 40 extending axially from each of the friction rings and through openings 32c in the flange, and three pre-energizer assemblies 42 shown in relief in FIG. 1.

The friction rings include cone friction surfaces 22a, 36a and 24a, 38a that engage for frictionally synchronizing the gears to the shaft prior to engagement of the jaw members. The friction surfaces 36a, 38a and/or 22a, 24a may be defined by any of several known friction materials affixed to the base member; herein, pyrolytic carbon friction materials, such as disclosed in U.S. Pat. Nos. 4,700,823; 4,844,218; and 4,778,548, are preferred. These patents are incorporated herein by reference.

Pins 40 each include major diameter portions 40a having diameters slightly less than the diameter of flange openings 32c, a reduced diameter or grooved portion 40b spaced between friction rings 36, 38 (herein midway), and conical blocker shoulders or surfaces 40c extending radially outwardly from the pin axis and axially away from each other at angles relative to a plane normal to the pin axis. The grooved portions, when disposed within their respective flange openings, allow limited rotation of the rigid friction ring and pin assembly relative to the flange to effect engagement of the pin blocker shoulders with chamfered blocker shoulders 32d defined about the flange openings 32c. The pins may be rigidly secured to friction rings 36, 38 in any of several known manners.

Figure 2:
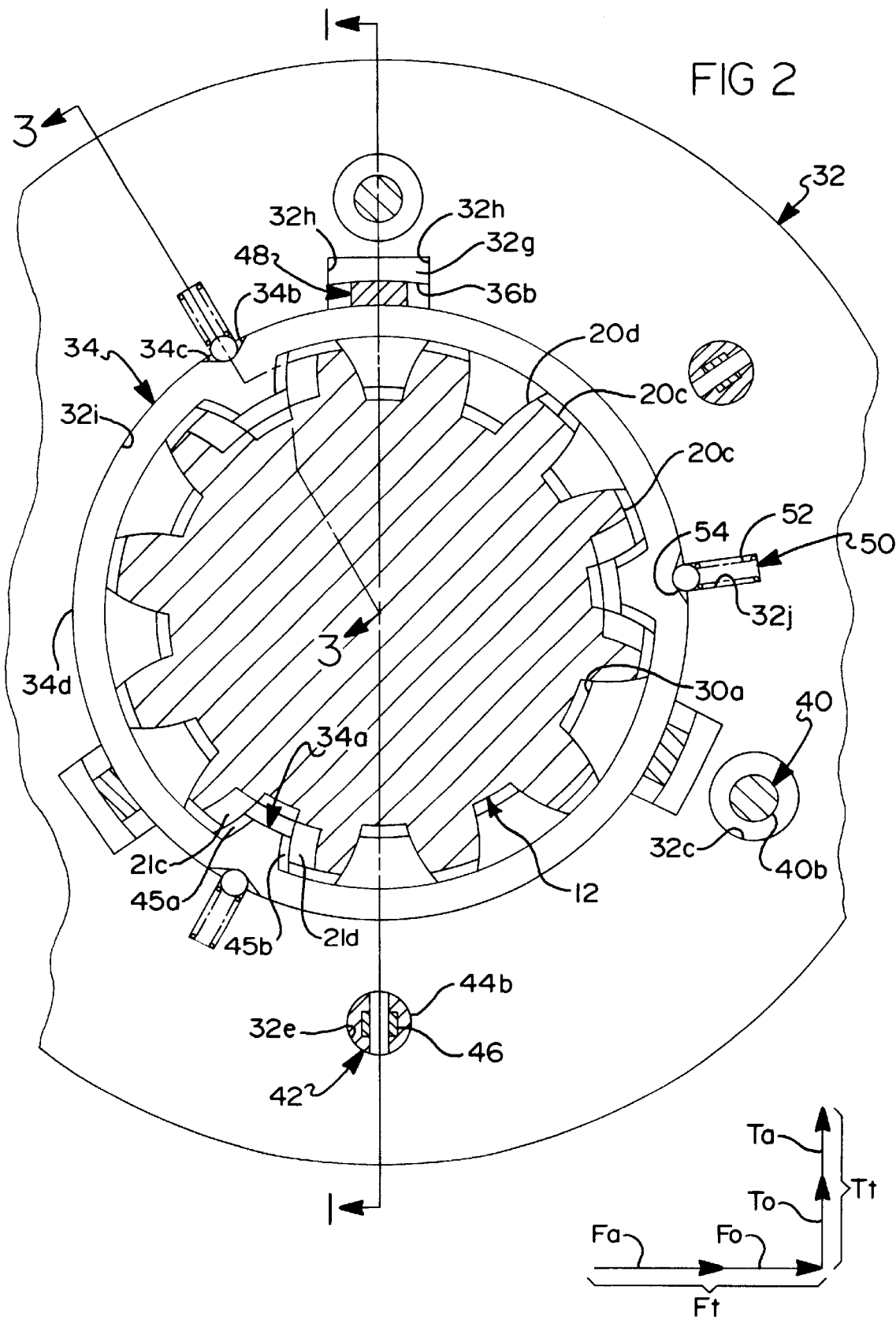
FIG. 2 illustrates the synchronizer of FIG. 1 sectioned along line 2—2 of FIG. 1.
Figure 3:
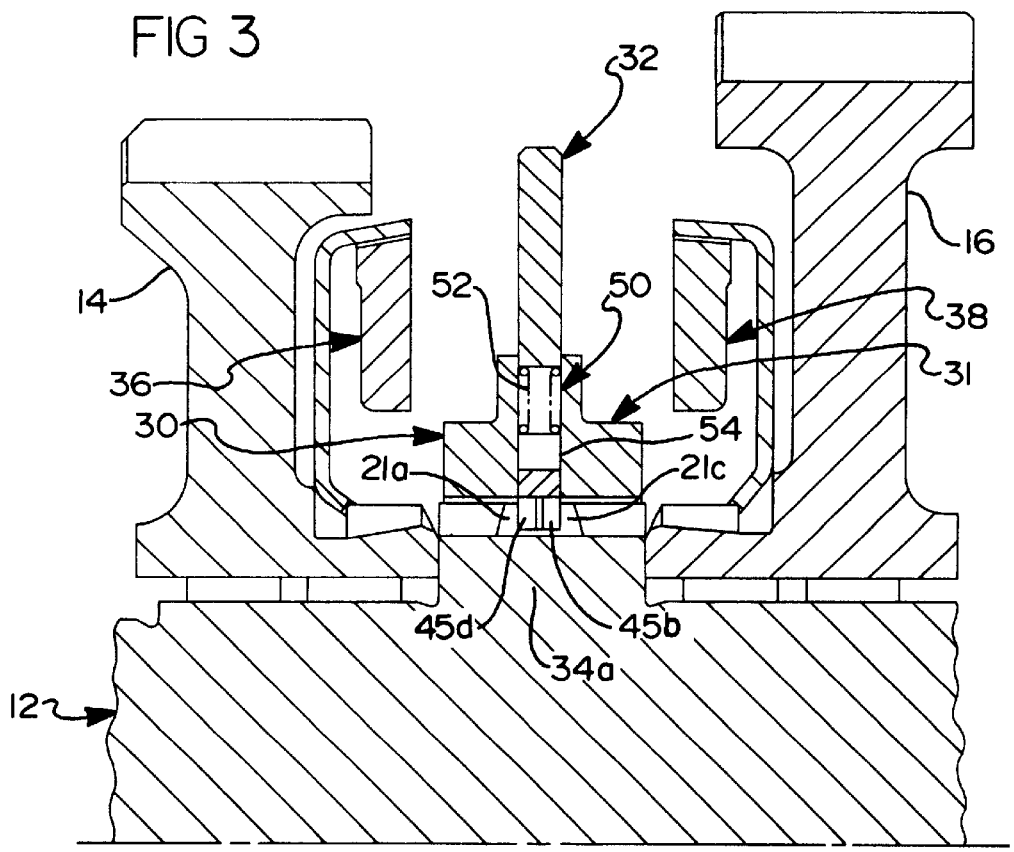
FIGS. 3 illustrates part of the synchronizer sectioned along line 3—3 of FIG. 2.
Figure 4:
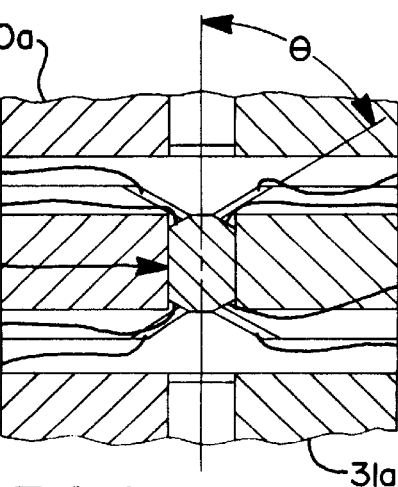
FIGS. 4 and 5 illustrate enlarged self-energizing components in FIGS. 2 and 3.
Figure 5:
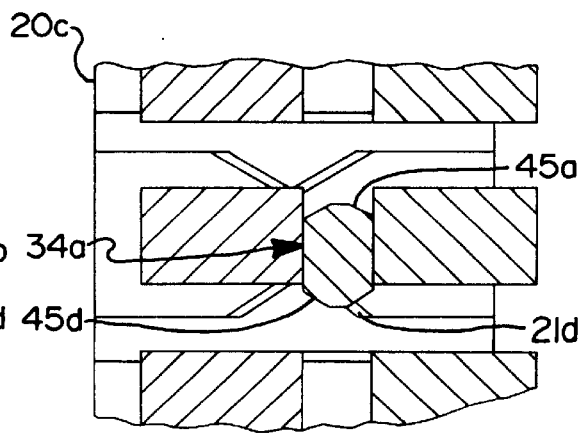

The pre-energizer assemblies 42 may be any of several types, herein they are of the split pin-type which are more completely shown and described in prior patents, e.g., U.S. Pat. No. 5,339,936. Each pre-energizer assembly extends axially between the friction rings 36, 38 and through one of openings 32e in the shift flange. The openings 32e are alternately spaced between openings 32c. It should suffice herein to mention that each pre-energizer assembly includes two shells 44 having ends 44a and at least two leaf springs 46 (shown only in FIG. 2) sandwiched between and biasing the shells apart. Each pair of shells 44 forms a major diameter less than the diameter of its associated opening 32e when squeezed together, and each pair define an annular groove 44b with chamfered end surfaces 44c. As is known, ends 44a react against friction rings 36, 38 and chamfers 44c react against chamfers 32f about openings 32e in flange 32 in response to initial engaging movement of flange 32, thereby effecting initial engaging movement of the friction clutches and initial torque for rotating pins 40 relative to flange 32 and positioning the blocker shoulders for engagement.

As previously mentioned, jaw members 30,31 include internal spline teeth 30a,31a which slidably mate with external spline teeth 20c of member 20 affixed to the shaft. The external splines have flank surfaces 20d extending parallel to the shaft axis and the mating thereof with flank surfaces of the jaw member splines prevents relative rotation therebetween. Jaw members 30,31 further include three axially extending and radially outwardly opening recesses 30b,31b each having a retainer 48 disposed therein. Each retainer 48 also extends through an opening 32g in the flange 32. The retainers prevent axial movement of the jaw members 30,31 relative to the flange by radially inwardly projecting ends 48a, and limit rotation of the flange relative to jaw members 30,31 and the shaft by contacting circumferentially spaced apart stops 32h defined by the openings 32g. Radially outward movement of retainers 48 relative to jaw members 30,31 is prevented by radially inner surfaces 36b,38b of friction rings 36, 38.

The self-energizer member 34 includes a radially outer periphery 34d, three self-energizing ramp assemblies 34a extending radially inwardly between external splines 20c, and three detent grooves defining detent ramps 34b,34c which are part of three detent or additive force limiting assemblies 50. Each assembly 50 includes a spring 52 biasing a follower or roller 54 radially inward into the associated detent groove. The springs are disposed in radially extending slots 32j in the flange and are retained in the axial direction by the jaw members 30,31. The detent assembly resiliently connects flange 32 and self-energizer member 34 in the rotational direction for purposes explained hereinafter.

As best seen in FIGS. 2–5, portions of external teeth 20c are modified to provide one or more self-energizing ramp surfaces which cooperate with a like number of ramp surfaces defined by each ramp assembly 34a of member 34. Each ramp assembly and the ramp surfaces thereon extend radially inward between the axially extending spaces between splines 20c. The ramp surfaces allow limited rotation of the self-energizer member 34 relative to flange 32 and jaw members 30, 31, and react synchronizing torque between the cone clutches and shaft 12 to provide an additive axial self-energizing force $F_a$ for increasing the engaging force of the cone clutch engaged through the blocker shoulders by an operator shift force $F_o$ applied to flange 32, thereby increasing the synchronizing torque provided by the cone clutch. Ramp surfaces may be provided for increasing synchronizing force for one or both gears and/or for increasing synchronizing force in response to torque in either direction, as is encountered for up and down shifts. More specifically, pairs of axially facing flank surfaces 20d of splines 20c have portions removed to provide self-energizing ramp or boost surfaces 21a, 21b, 21c, 21d. Self-energizing ramp or boost surfaces 21a, 21b respectively react against self-energizing ramp or boost surfaces 45a, 45b on ramp assembly 34a to provide the additive axial forces to increase or assist the synchronization rate of gear 14 in response to torque in either direction. Ramp surfaces 21c, 21d respectively react against ramp surfaces 45c, 45d to provide the additive axial forces for gear 16 in response to synchronizing torque in either direction. If no additive axial force is preferred in one direction for one gear or more, the ramp surfaces may be parallel to the spline, i.e., no effective ramp surfaces are provided. The magnitude or amount of the axial additive forces $F_a$, as explained further hereinafter, is limited by detent or force limiting assemblies 50.

When the flange 32 is in the neutral position of FIGS. 1–4, reduced diameter portions 40b of pins 40 are radially aligned with their associated flange openings 32c, and friction surfaces of the cone clutches are slightly spaced apart and are maintained in this spaced relation by pre-energizer chamfer surfaces 44c acting on flange pre-energizer chamfer surfaces 32f due to the force of pre-energizer springs 46. When it is desired to couple either gear to the shaft, an appropriate and unshown shift mechanism, such as disclosed in U.S. Pat. No. 4,920,815 and incorporated herein by reference, is connected to the outer periphery of flange 32 in known manner for moving the flange axially along the axis of shaft 12 either left to couple gear 14 or right to couple gear 16. The shift mechanism may be manually moved by an operator through a linkage system, may be selectively moved by an actuator, or may be moved by means which automatically initiate shift mechanism movement and which also controls the magnitude of the force applied by the shift mechanism. When the shift mechanism is manually moved, the force is proportional to the force applied by the operator to a shift lever. Whether manually or automatically applied, the force is applied to flange 32 in an axial direction and is represented by the length of arrow $F_o$ in FIG. 6.

Initial rightward axial movement of flange 32 by the operator shift force $F_o$ is transmitted by the pre-energizer chamfer surfaces 44c to friction ring 38 to effect initial frictional engagement of cone surface 38a with cone surface 24a. The initial engagement force of the cone surface is of course a function of the force of pre-energizer springs 46 and the angles of the pre-energizer chamfer surfaces. The initial frictional engagement (provided an asynchronous condition exists and momentarily ignoring the effect of the self-energizing ramps) produces an initial cone clutch engaging force and synchronizing torque which ensures limited relative rotation between flange 32 and the engaged friction ring, and hence, movement of the reduced diameter pin portion 40b to the appropriate sides of the flange openings 32c to provide engagement of pin blocker shoulders 40c with flange blocker shoulders 32d. When the blocker shoulders are engaged, the full operator shift force $F_o$ on flange 32 is transmitted to friction ring 38 via the blocker shoulders, whereby the cone clutch is engaged by the full force of the operator shift force $F_o$ to provide a resultant operator synchronizing torque $T_o$. This operator synchronizing torque $T_o$ is represented by arrow $T_o$ in FIG. 6. Since the blocker shoulders are disposed at angles relative to the axial direction of operator shift force $F_o$, they produce a counter force or unblocking torque which is counter to the synchronizing torque from the cone clutch but of lesser magnitude during asynchronous conditions. As substantial synchronism is reached, the synchronizing torque drops below the unblocking torque, whereby the blocker shoulders move the pins into concentric relation with openings 32c to allow continued axial movement of the flange and engagement of the external jaw teeth of jaw member 28 with internal jaw teeth 31a of jaw member 31, thereby completing a shift into gear 16. Axial movement of the flange 32 to the left to synchronize and positive clutch gear 14 to shaft 12 is analogous to the above and the shift is completed when internal jaw teeth 30a of jaw member 30 mate with the external jaw teeth of jaw member 26. The spline/jaw teeth may be configured as shown in U.S. Pat. Nos. 3,265,171 and 4,246,993 which are incorporated herein by reference.

Still ignoring the effects of the self-energizing ramps, cone clutch torque provided by the force $F_o$ is expressed by equation (1).

$$T_0 = F_o R_c \mu_c / \sin \alpha \quad (1)$$

where:

$R_c$=the mean radius of the cone friction surface, $\mu_c$=the coefficient of friction of the cone friction surface, and $\alpha$=the angle of the cone friction surfaces.

Looking now at the affects of the self-energizing cams, the synchronizing torque $T_o$, due to the operator applied axial shift force $F_o$, is of course transmitted to flange 32 by pins 40 and is reacted to shaft 12 across force limiting or detent assemblies 50 and the self-energizing ramps. The self-energizing ramps, when engaged, produce the axial additive force $F_a$ acting on the flange in the same direction as shift force $F_o$. The axial additive force $F_a$ is applied to the engaged friction surfaces through the blocker surfaces via a force path including self-energizer member 34, jaw clutch 30 or 31, and flange 32. The forces $F_o$ and $F_a$ are applied to shift flange 32 in parallel and sum to provide a total force $F_t$, thereby further increasing the engaging force of the cone clutch to provide an additive synchronizing torque $T_a$ which adds to the torque $T_o$ to provide a total torque $T_t$. The sum of the axial forces for engaging the cone clutch are $F_o$ plus $F_a$ and the sum of the synchronizing torques being produced by the cone clutch are $T_o$ plus $T_a$, as graphically shown in FIG. 6. When the torque $T_t$ exceeds the detent torque settings of detent assemblies 50, rollers 54 move up detent ramps 34b,34c of the detent grooves and allow the flange to rotate relative to self-energizer member 34 and jaw clutches 30,31 until retainers 48 contact stops 32h in one direction, thereby providing a second or bypass torque path to shaft 12 for limiting the maximum synchronizing torque that can be reacted across the self-energizing ramps to a predetermined amount that is determined by the force limiting settings of the detent assemblies. Each pair of detent 34b,34c ramps may have the same ramp angle relative to each other, thereby providing the same maximum additive axial force $F_a$ for upshifts and downshifts or, as shown herein, one ramp of each pair may have a greater angle relative to the other to provide a greater maximum additive axial force in one shift direction.

The main variables and equations for calculating self-energizing ramp angles $\theta$ may be seen by reference to previously mentioned U.S. Pat. No. 5,092,439.

A pin-type synchronizer embodiment has been disclosed to illustrate inventive subject matter herein. The following claims are intended to cover inventive portions of the disclosed subject matter and variations and modifications believed to be within the spirit of the invention.

What is claimed is:

1. A synchronizer selectively operative to frictionally synchronize positively connect a first drive mounted for rotation about an axis of a second drive; the synchronizer including:

a first jaw member affixed to the first drive and engagable with an axially movable second jaw member in response to an engaging movement thereof by an axial shift force ($F_o$), the second jaw member mounted for non-rotation and for axial movement relative to the second drive;

a first friction member secured for rotation with the first drive and a second friction member axially movable into frictional engagement with the first friction member to provide a synchronizing torque between the drives in response to the engaging movement;

blocker means movable into engagement in response to the engaging movement of the second jaw member for preventing asynchronous engagement of the jaw members and for transmitting the shift force ($F_o$) to effect an engagement force of the first and second friction members;

first self-energizing means affixed against movement relative to the second drive, second self-energizing means engagable with the first self-energizing means in response to the torque transmitted thereto, and the first and second self-energizing means operative when engaged to produce an additive force ($F_a$) in a direction of the shift force ($F_o$) for increasing the engagement force of the first and second friction members; the improvement comprising:

force limiting means for limiting the additive force ($F_a$) to a predetermined amount of the torque and including resilient means and stop means, the resilient means for flexibly transmitting the torque between the blocker means and the second self-energizing means, flexing of the resilient means in response to the torque causing relative rotation between the blocker means and the second self-energizing means, and the stop means operative when engaged in response to the predetermined amount of the torque and the relative rotation to connect the blocker means to the second drive in a bypass torque path in driving parallel with the resilient means to limit the torque reacted by the first and second self-energizing means to the predetermined amount of the torque.

2. The synchronizer of claim 1, wherein:

the force limiting means is a detent having the resilient means reacting between the blocker means and the second self-energizing means.

3. The synchronizer of claim 1, wherein:

a first member is interposed between the blocker means and the second self-energizing means, and the resilient means reacts between the first member and the second self-energizing means.

4. The synchronizer of claim 3, wherein:

the resilient means is disposed for rotation with the first member.

5. The synchronizer of claim 4, wherein:

retainer means secure the first member against axial movement relative to the second jaw member.

6. The synchronizer of claim 5, wherein:

the first member is a radially extending flange; and the stop means connect the flange to the second drive via the second jaw member.

7. The synchronizer of claim 5, wherein:

the force limiting means is a detent.

8. The synchronizer of claim 3, wherein:

the first member includes an inner periphery; and the second self-energizing means includes an outer periphery disposed within the first member inner periphery.

9. The synchronizer of claim 8 wherein:

the force limiting means is a detent including first and second ramps defining a recess in one of the peripheries, and a follower is biased into the recess by the resilient means.

10. The synchronizer of claim 9, wherein:

the first ramp has a greater angle relative to the second ramp for providing a greater additive force ($F_a$) than the second ramp.

11. The synchronizer of claim 10, wherein:

the ramps are formed in the outer periphery and the resilient means is disposed to rotate with the first member.

12. The synchronizer of claim 11, wherein:

the first member is a radially extending flange;

the stop means connect the flange to the second drive via the second jaw member;

retainer means secure the flange against axial movement relative to the second jaw member.

13. The synchronizer of claim 12, wherein:

a plurality of circumferentially spaced apart pins rigidly extend axially from the second friction member and into a first set of openings in the flange, and the blocker means are defined about the associated openings and the pins.

14. A synchronizer selectively operative to frictionally synchronize and positively connect either of first and second drives respectively mounted for relative rotation about an axis of a shaft; the synchronizer including:

first and second jaw members affixed respectively to the first and second drives and respectively engagable with axially movable third and fourth jaw members in response to an engaging movement thereof by an axial bidirectional shift force ($F_o$), the third and fourth jaw members mounted for non-rotation and for axial movement relative to the shaft;

first and second friction members respectively secured for rotation with the first and second drives, and third and fourth friction members axially movable into frictional engagement respectively with the first and second friction members to provide a synchronizing torque between the drives and the shaft in response to the engaging movement;

blocker means movable into engagement in response to the engaging movement of either of the third and fourth jaw members for preventing asynchronous engagement of the jaw members and for transmitting the shift force ($F_o$) to effect an engagement force of the friction members;

first self-energizing means affixed against movement relative to the shaft, second self-energizing means engagable with the first self-energizing means in response to the torque transmitted thereto, and the first and second self-energizing means operative when engaged to produce an additive force ($F_a$) in a direction of the shift force ($F_o$) for increasing the engagement force of the friction members; the improvement comprising:

force limiting means for limiting the additive force ($F_a$) to a predetermined amount of the torque and including resilient means and stop means, the resilient means for flexibly transmitting the torque between the blocker means and the second self-energizing means, flexing of the resilient means in response to the torque causing relative rotation between the blocker means and the second self-energizing means, and the stop means operative when engaged in response to the predetermined amount of the torque and the relative rotation to connect the blocker means to the second drive in a bypass torque path in driving parallel with the resilient means to limit the torque reacted by the first and second self-energizing means to the predetermined amount of the torque.

15. The synchronizer of claim 14, wherein:

the force limiting means is a detent having the resilient means reacting between the blocker means and second self-energizing means.

16. The synchronizer of claim 14, wherein:

a first member is interposed between the blocker means and the second self-energizing means, and the resilient means reacts between the first member and the second self-energizing means.

17. The synchronizer of claim 16, wherein:

the resilient means is disposed for rotation with the first member.

18. The synchronizer of claim 17, wherein:

retainer means secure the first member against axial movement relative to the third and fourth jaw members.

19. The synchronizer of claim 18, wherein:

the first member is a radially extending flange; and the stop means connect the flange to the shaft via the third and fourth jaw members.

20. The synchronizer of claim 16, wherein:

the first member includes an inner periphery; and the second self-energizing means includes an outer periphery disposed within the first member inner periphery.

21. The synchronizer of claim 20, wherein:
the force limiting means is a detent.

22. The synchronizer of claim 20, wherein:
the force limiting means is a detent including first and second ramps defining a recess in the outer periphery, and a follower is biased into the recess by the resilient means carried by the first member.

23. The synchronizer of claim 22, wherein:
the first ramp has a greater angle relative to the second ramp for providing a greater additive force ($F_a$) than the second ramp.

24. The synchronizer of claim 23, wherein:
the ramps are formed in the outer periphery and the resilient means is disposed to rotate with the first member.

25. The synchronizer of claim 16, wherein:
the first member is a radially extending flange; and
the stop means connect the flange to the shaft via the third and fourth jaw members.

26. The synchronizer of claim 25, wherein:
the third and fourth jaw members are separate jaw members;
the radially extending flange has axially oppositely facing sides positioned between the third and fourth jaw members; and
retainer means secure the flange against axial movement relative to the third and fourth jaw members.

27. The synchronizer of claim 26, wherein:
a plurality of circumferentially spaced apart pins rigidly extend axially between the third and fourth friction members and into a first set of openings in the flange, and the blocker means are defined about associated openings and the pins.

28. A synchronizer selectively operative to frictionally synchronize and positively connect either of first and second drives respectively mounted for relative rotation about an axis of a shaft; the synchronizer including:

first and second jaw members affixed respectively to the first and second drives and respectively engagable with axially movable third and fourth jaw members in response to an engaging movement thereof by an axial bidirectional shift force ($F_o$), the third and fourth jaw members mounted for non-rotation and for axial movement relative to the shaft;

first and second friction members respectively secured for rotation with the first and second drives and third and fourth friction members axially movable into frictional engagement respectively with the first and second friction members to provide a synchronizing torque between the drives and the shaft in response to the engaging movement;

a radially extending flange having axially oppositely facing sides positioned between the third and fourth jaw members and between the third and fourth friction members for axially moving the jaw members and friction members into said engagements in response to the bi-directional shift force ($F_o$) applied to the flange;

retainer means for securing the flange against axial movement relative to the third and fourth jaw members;

stop means for limiting rotation of the flange relative to the third and fourth jaw members;

blocker means movable into engagement in response to the engaging movement of either of the third and fourth jaw members for preventing asynchronous engagement with the first and second jaw members and for transmitting the shift force ($F_o$) to effect an engagement force of the friction members for increasing the engagement force thereof, the blocker means including a plurality of circumferentially spaced apart pins rigidly extending axially between the third and fourth friction members and into a first set of openings in the flange, each of the pins having blocker shoulders engagable with blocker shoulders defined about an associated one of the openings;

first self-energizing means affixed against movement relative to the shaft, second self-energizing means engagable with the first self-energizing means in response to the torque transmitted thereto via a torque path including the blocker means and the flange, the first and second self-energizing means operative when engaged to produce an additive force ($F_a$) in a direction of the shift force ($F_o$) for further increasing the engagement force of the friction members, and the second self-energizing means secured against axial movement relative to the flange; the improvement comprising:

force limiting means for limiting the additive force ($F_a$), the force limiting means including resilient means for connecting the flange for rotation with the second self-energizing means, the resilient means allowing engagement of the stop means when flexed by a predetermined amount of the torque, and the stop means rotationally connecting the flange to the shaft in a bypass torque path in driving parallel with the resilient means to limit the torque reacted by the first and second self-energizing means to the predetermined amount of the torque.

29. The synchronizer of claim 28, wherein:
the force limiting means is a detent having the resilient means reacting between the flange and second self-energizing means.

30. The synchronizer of claim 29, wherein:
the resilient means is disposed for rotation with the flange.

31. The synchronizer of claim 28, wherein:
the flange includes an inner periphery; and
the second self-energizing means includes an outer periphery disposed within the flange inner periphery.

32. The synchronizer of claim 31, wherein:
the force limiting means is a detent having the resilient means reacting between the flange and the outer periphery.

33. The synchronizer of claim 31, wherein:
the force limiting means is a detent include first and second ramps defining a recess in one of the peripheries, and a follower is biased into the recess by the resilient means.

34. The synchronizer of claim 33, wherein:
the ramps are formed in the outer periphery and the resilient means is disposed to rotate with the flange.

35. The synchronizer of claim 34, wherein:
the stop means connect the flange to the shaft via the third and fourth jaw members.

36. The synchronizer of claim 33, wherein:
the first ramp has a greater angle relative to the second ramp for providing a greater additive force ($F_a$) than the second ramp.

37. The synchronizer of claim 28, wherein:
the stop means connect the flange to the shaft via the third and fourth jaw members.

* * * * *